United States Patent [19]

Warner et al.

[11] Patent Number: 5,077,901

[45] Date of Patent: Jan. 7, 1992

[54] CERAMIC BLADES AND PRODUCTION METHODOLOGY THEREFOR

[76] Inventors: Joseph A. Warner, 6480 Curtis Rd., Peyton, Colo. 80831; Leo A. Kennedy, 770 Wooten Rd., Suite 110, Colorado Springs, Colo. 80915

[21] Appl. No.: 525,447

[22] Filed: May 18, 1990

[51] Int. Cl.⁵ .......................... B26B 9/02; B26B 21/54; B24B 7/20
[52] U.S. Cl. .................................. 30/357; 30/346.53; 51/285
[58] Field of Search ............. 30/320, 329, 346.53, 30/317, 123 R, 357; 76/DIG. 8, 101.1, 106.5; 606/166, 168, 171, 172; 51/285

[56] References Cited

U.S. PATENT DOCUMENTS

| | | | |
|---|---|---|---|
| 3,292,478 | 12/1966 | Falk et al. | 30/357 |
| 3,349,488 | 10/1967 | Craig | 30/346.53 |
| 3,514,856 | 6/1970 | Camp et al. | 30/346.53 |
| 3,543,402 | 12/1970 | Seager | 30/346.53 |
| 3,926,601 | 12/1975 | Hicks, Jr. | 76/DIG. 8 |
| 4,078,338 | 3/1978 | Baughcom | 51/285 |
| 4,201,599 | 5/1980 | Morgans | 30/346.53 |
| 4,330,576 | 5/1982 | Dodd | 76/DIG. 8 |
| 4,495,698 | 1/1985 | Gerber, Jr. | 30/357 |
| 4,718,200 | 1/1988 | Miquelot | 30/158 |
| 4,787,146 | 11/1988 | Gaskins | 30/357 |

OTHER PUBLICATIONS

Jensen 1987-1988 Catalog, Jensen Tools Inc. an AXIA Enterprise, located at 7815 S. 46th Street, Phoenix, AZ 85044-5399.

*Primary Examiner*—Douglas D. Watts
*Assistant Examiner*—Paul M. Heyrana, Sr.
*Attorney, Agent, or Firm*—Timothy J. Martin; Dana S. Rewoldt

[57] ABSTRACT

A ceramic cutting blade includes a cutter portion having first and second side edges which converge at a distal acute angle to form a distal cutting tip and a cutting edge formed by first and second cutting faces oriented at a bevel angle. At least one of the cutting faces includes striations having a grain direction substantially perpendicular to the cutting edge, and these striations have a width of between 20 and 40 microns. The distal acute angle is preferably less than forty degrees, and the cutting tip is truncated along a straight line at an angle of truncation of at least forty degrees with respect to the cutting edge. The blade may be received by a handle or may be integrally molded with a handle portion.

14 Claims, 5 Drawing Sheets

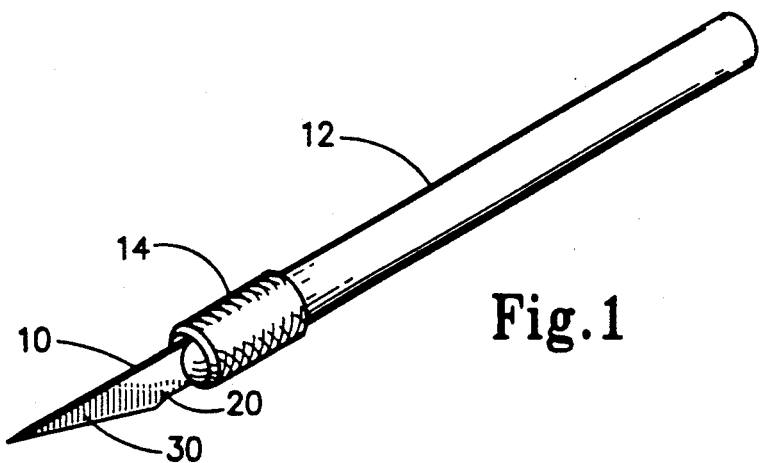
Fig.1
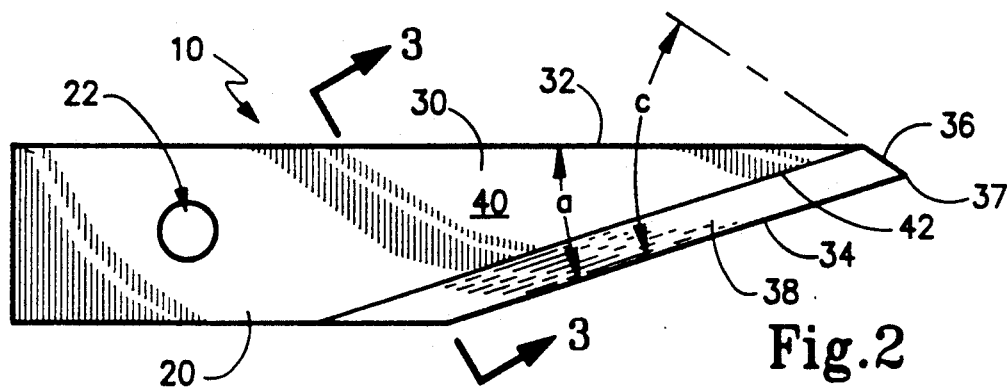
Fig.2
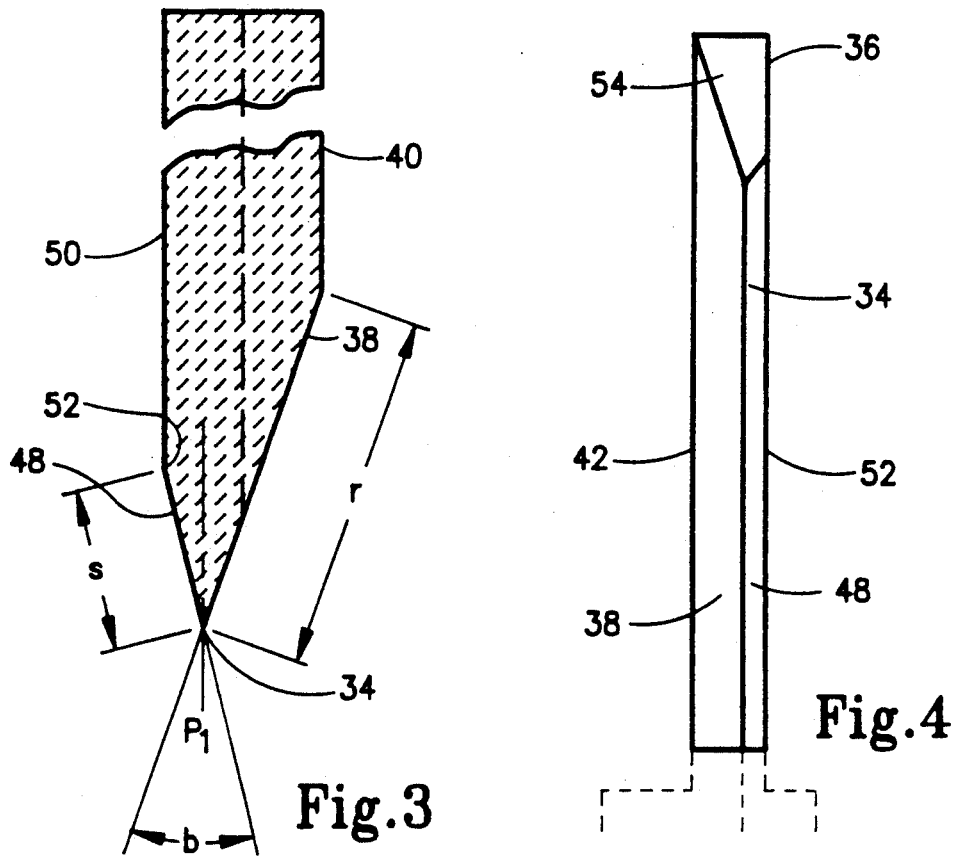
Fig.3
Fig.4

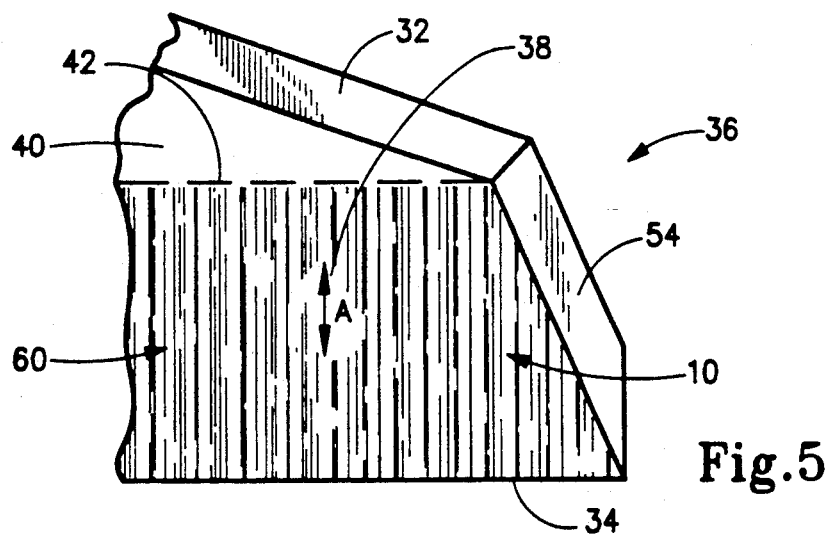
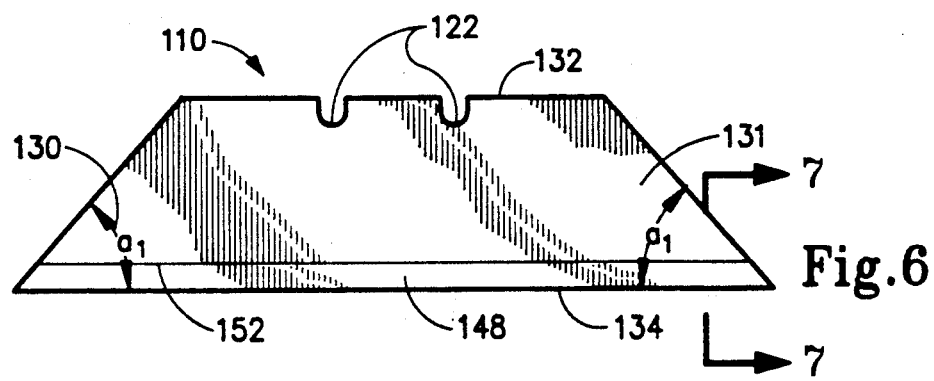
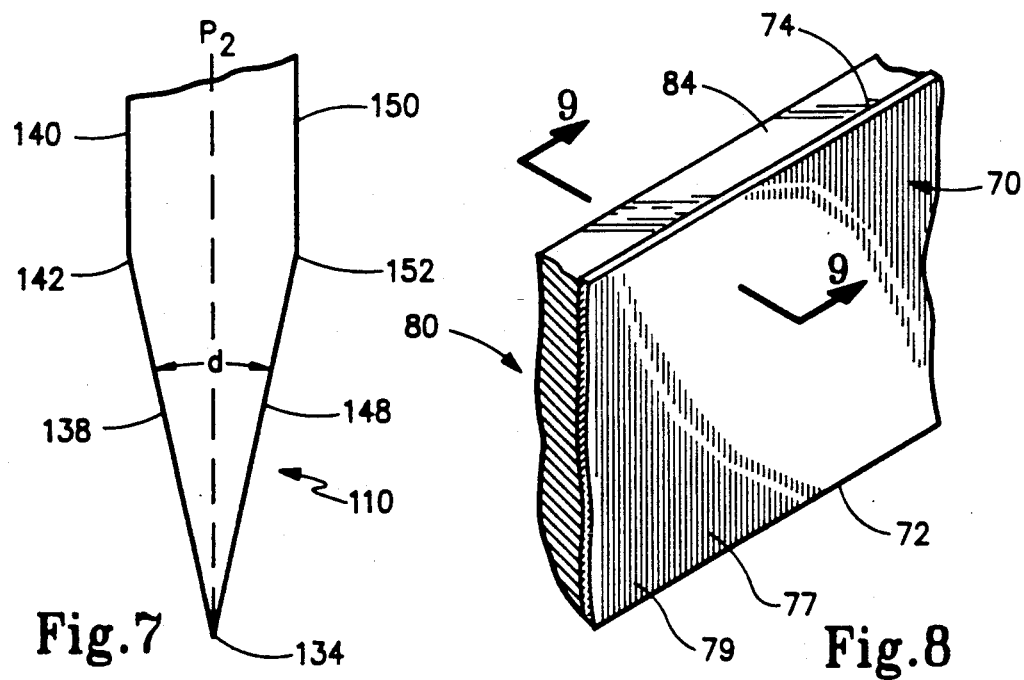

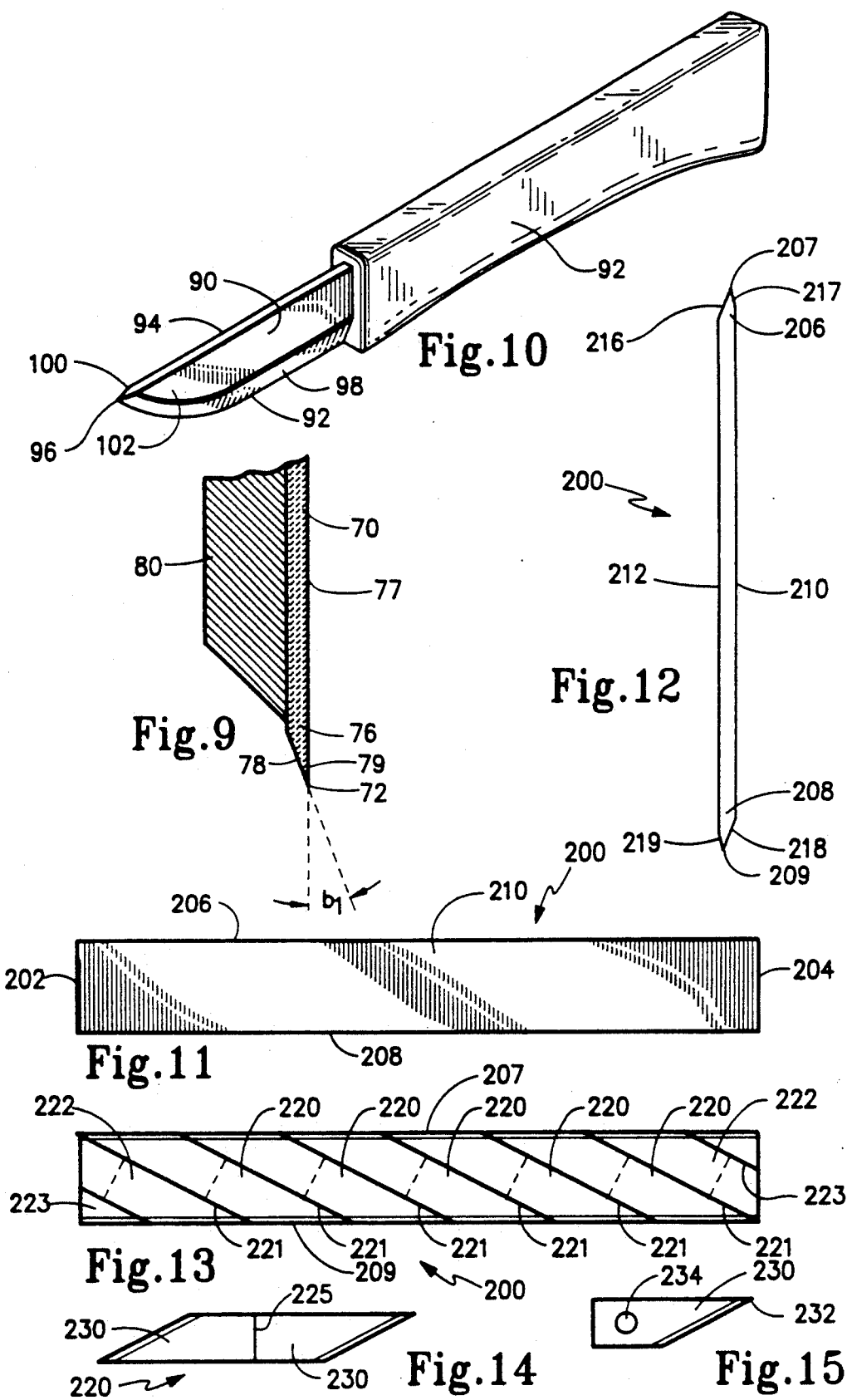

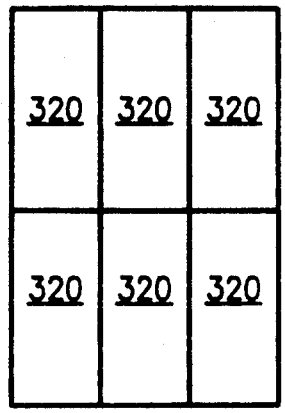
Fig.21a
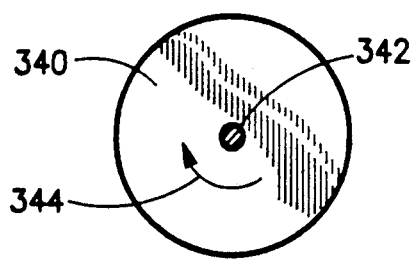
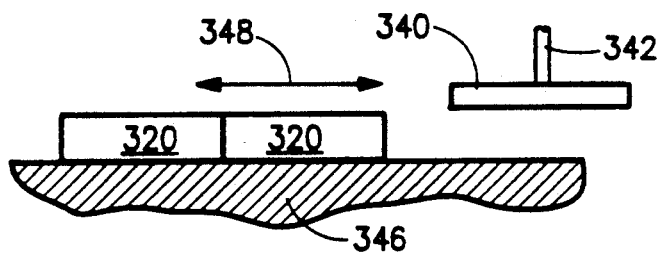
Fig.21b
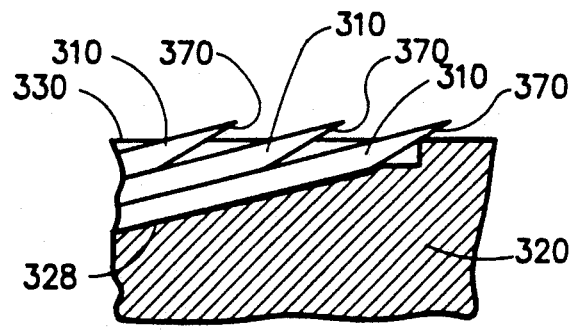
Fig.20
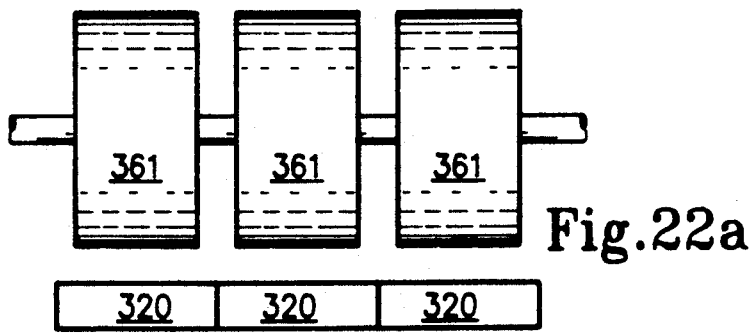
Fig.22a
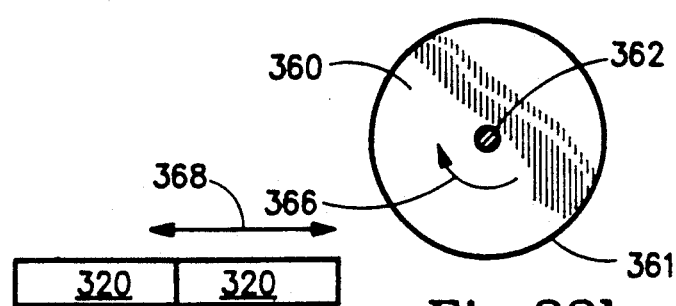
Fig.22b

CERAMIC BLADES AND PRODUCTION METHODOLOGY THEREFOR

FIELD OF THE INVENTION

The present invention generally relates to cutting instruments such as knives, scalpels, razors, scissors and the like. Specifically, however, the present invention relates to ultra-sharp cutting tools constructed of non-metallic ceramic materials and which may be either fabricated as a blade mountable to a reusable handle, as a laminate layer to form a cutting surface for a substrate or as a blade formed integrally with a handle portion.

BACKGROUND OF THE INVENTION

One of the earliest cutting instruments known to man were stone knives developed in prehistoric times. These blades were made by pressure flaking selected materials, such as quartz and obsidian, to create an edge of relative sharpness that could be used for cutting, piercing and/or scrapping.

While various advancements were made over time to the art of forming these stone knives, the next historical advancement occurred with the development of various blades out of metals approximately 10,000 years ago. Metals were favored for their durability and malleability and did not exhibit the brittleness of their stone ancestors. Improvements in technology rationally followed with the development of different metals extending chronologically from copper to bronze to iron and steel.

Metallic cutting blades have dominated the state of the art up until the present time. However, recent development in materials science has yielded ceramic materials which in many ways exhibit superior properties over their metallic counterparts as disclosed by the inventors of the within described technology. These advantages when such blades are manufactured according to the methods described herein, include higher edge retaining properties, self sharpening characteristics, non-contaminating properties and the characteristics of cleanliness and sterility, where desired. Accordingly, despite the sucess of metal blades, there remains a long felt need for improved blade devices, and the present invention seeks to satisfy that need.

The need for better cutting edges can be highlighted in the industrial and medical fields. In the industrial arena, substantial costs may be experienced by those who employ metal blades in high use applications. These costs not only include the replacement of a blade part, but also in the maintenance time involved to replace a blade as well as in down time of equipment wherein blades are being replaced. With the growth of the micro-electronics industry, metal blades are less desirable due to the inherent nature of metallic elements to contaminate a semi-conductor device especially where the materials used to form the semi-conductor device have a greater hardness than the hardness of the metal blade so that contact between a crystal and the metallic blade may result in metallic contaminants associating with the semi-conductor crystal.

In medical applications, metal blades have some inherent porosity regardless of how finely crafted the blade is. Thus, although these blades may be sterilized, there is some risk, however small, that an instrument may remain contaminated by viral or other disease causing microbes. Ceramic materials, on the other hand, do not have the porosity of metal; thus, contaminants are more readily removed. Further, due to their high vapor pressure, ceramic blades may be sterilized at temperatures which would melt metallic blades thus increasing the level of sterilization. Accordingly, therefore, there is a modern need for ceramic knives that has only been recently recognized. Further, there is a need for improved technologies both in blade configuration and in construction methodologies therefor. This invention, therefor, is directed toward meeting those needs.

SUMMARY OF THE INVENTION

It is an object of the present invention to provide an improved ceramic blade construction and fabrication methodology therefor which enhances the cutting abilities of ceramic blades.

Another object of the present invention is to provide a new and useful ceramic blade construction and fabrication methodologies which may be industrially applied to produce an inexpensive ceramic blade which, if desired, may be disposable.

Still a further object of the present invention is to provide a ceramic blade construction and fabrication methodology which produces such a blade wherein pressure flaking of the blade results in the maintenance of a sharp edge.

Yet another object of the present invention is to provide a ceramic blade construction and fabrication methodology therefor wherein the ceramic blade is resistant to chipping or nicking.

Another object of the present invention is to provide a ceramic blade construction which has a reduced cross-sectional cutting profile while at the same time maintaining strength of the blade body.

According to the present invention, then, the present invention contemplates a ceramic blade adapted to be held by a reusable handle or fabricated integrally with said handle wherein the blade is adapted for use in performing cutting operations. The blade itself comprises a blade body which has a mounting portion that is received in and retained by the handle or is otherwise attached to the handle and a cutter portion which is extends from the mounting portion. The cutter portion has side surfaces and first and second side edges which converge at distal acute angle with respect to one another to form a distal cutting tip. At least one of the first and second side edges defines a cutting edge formed by first and second cutting faces oriented at an acute bevel angle with respect to one another. The mounting portion and said cutting portion are fabricated out of an integral piece of ceramic material wherein the distal acute angle may be in the range of approximately 20°-50°, and wherein said bevel angle is within a range of approximately 16° to 34°.

According to the more detailed construction of the above described blade, the ceramic blade according to the present invention may be formed integrally with a ceramic handle. Alternately, the ceramic blade may be laminated onto a substrate, such as a metal or plastic substrate, to enhance strength. The cutting faces extend between the cutting edge and respect side surface to respectively define cutting surface widths which can be different for each of the cutting faces. It is preferable that the cutting faces intersect their respective side surface at the same angle. Thus, with respect to a reference plane located centrally between the side surfaces and extending longitudinally of the cutting portion substantially parallel to the cutting edge, the cutting edge is offset from the reference plane.

An important feature of the present invention is that each cutting surface has striations which are oriented to have a grain direction that is substantially perpendicular to the cutting edge and which striations have a lateral dimension or width in a range of 20 to 40 microns. If desired, the distal cutting tip of the blade may be truncated along the angle of truncation to increase the tip strength. The angle of truncation may be within a range of 40° to 50°, but is preferably 45°.

According to the methodology of the present invention, a broad method comprises the steps of forming a blade adapted for use in cutting operations comprising a first step of producing a blade blank out of integral piece of ceramic material wherein the blade blank has opposite side surfaces. A cutting edge is formed by forming a pair of intersecting cutting faces along an edge of the blade blank so that each of the cutting faces extends from the cutting edge and diverge from one another to intersect a respective side surface. The cutting faces are formed by consecutively rough grinding and polish grinding each cutting face, with the step of polish grinding each cutting face being conducted by means of grinding the respective cutting face in a direction perpendicularly of the cutting edge to establish striations have a grain direction that extends perpendicularly from the cutting edge. The steps of rough and polish grinding for each cutting face may either be conducted parallel or sequentially. That is, the rough grinding step may be performed for both cutting faces before either cutting face is polish ground; alternately, the rough and polish grinding steps may be performed on a single cutting face before the other cutting face is rough and polished ground.

In the rough grinding step, the cutting face may be rough ground by means of an intermediate grinding wheel having a diamond grit of a size between 180 and 320 and preferably 220 grit. The step of polish grinding each cutting face is conducted by means of a final grinding wheel having a diamond grit of a size between 500 and 800 and preferably 20 microns. The final grinding wheel forming the polish grind preferably is rotatably driven about an axis that is parallel to each respective cutting face although the rough grinding step may be performed by an intermediate wheel that is rotary driven about an axis that is perpendicular to the cutting face.

Where a large blade blank is used, edges may be cut and the blade blank may be separated into a plurality of individual blades after the final cutting edge is formed wherein each of the resulting blades includes a portion of the final cutting edge. In one method described in the present invention, a plurality of blade blanks are mounted on a common support fixture as an ensemble organized along parallel planes whereby a first intermediate cutting face is formed on each respective blade blank in the first ensemble contemporaneously by a rough grinding wheel and whereby each respective intermediate cutting face of each of the ensemble is contemporaneously polish ground to form a plurality of semi-finished blade blanks. Thereafter, a plurality of semi-finished blade blanks maybe flipped and mounted on a common support as a second ensemble organized along parallel planes so that a second intermediate cutting face is formed on each respective semi-finished blade blank in the second ensemble contemporaneously by the rough grinding wheel after which each respective second intermediate cutting face may be contemporaneously polish ground to form plurality of finished blades.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 1 is a perspective view of a ceramic blade according to the present invention shown supported by a handle assembly;

FIG. 2 is a side view in elevation of first exemplary embodiment of the ceramic blade according to the present invention;

FIG. 3 is a cross-sectional view taken about lines 3—3 of FIG. 2;

FIG. 4 is an end view in elevation of the ceramic blade shown in FIG. 2;

FIG. 5 is an enlarged perspective view of the distal end of the ceramic blade shown in FIGS. 2-4;

FIG. 6 is a side view in elevation of a second exemplary embodiment of the ceramic blade according to the present invention;

FIG. 7 is a cross-sectional view taken about lines 7—7 of FIG. 6;

FIG. 8 is a perspective view, cut away, to show another alternate embodiment of the ceramic blade of the present invention in a laminate construction and having a single striated cutting face;

FIG. 9 is a cross-section view taken about line 9—9 of FIG. 8;

FIG. 10 is a perspective view of yet another embodiment of the present invention showing the blade integrally constructed with a ceramic handle;

FIG. 11 is a top plan view of a sample blade blank used to fabricate ceramic blades according to a first exemplary embodiment of the methodology according to the present invention;

FIG. 12 is an end view in elevation showing the blade blank of FIG. 11 after being processed to produce opposite cutting edges according to the first exemplary methodology of the present invention;

FIG. 13 is a top plan view of the blade blank shown in FIG. 12 and further showing separation lines according to the first exemplary methodology of the present invention;

FIG. 14 is a top plan view of a ceramic blade pair separated from the blade blank of FIG. 13;

FIG. 15 shows a top plan view of a ceramic blade severed from the blade pair of FIG. 14 and further processed to truncate the tip thereof and to provide a mounting hole;

FIG. 20 is an enlarged cross-sectional view of a portion of the fixture shown after mounting of blade blanks which have had a first cutting face formed thereon;

FIGS. 21a and 21b show a first grinding operation on a plurality of mounting blocks and blade ensembles in order to rough grind the cutting faces thereof; and FIGS. 22a and 22b show the processing of a plurality of mounting blocks and ceramic blade ensembles in order to polish grind the cutting faces thereof.

DETAILED DESCRIPTION OF THE EXEMPLARY EMBODIMENTS AND METHODOLOGIES

Figure 16:
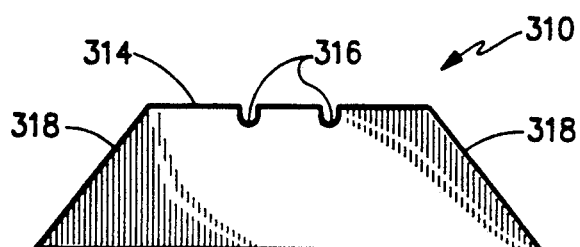
FIG. 16 shows a representative blade blank used in a second exemplary methodology according to the present invention.

The present invention is directed to ceramic blades and production methodology therefor. It is heretofor been known that cutting instruments and blades therefor could be fabricated out of ceramic materials; however, difficulties have been experienced in the ability of such blades to hold an edge and to present a substantial blade profile that is relatively durable and resists breakage and nicking. The present invention, therefore, teaches a new blade construction and fabrication methodologies whereby an improved ceramic blade may be produced. Exemplary blade embodiments are described and two specific embodiments of the general methodology of the present invention are presented in this application.

As is shown, then, in FIG. 1, a blade 10 according to a first exemplary embodiment of the present invention is mounted in a handle assembly 12. It may be appreciated that the blade 10 shown in FIG. 1 is of a type commonly referred to as a hobby blade so that it has a mounting portion 20 and a cutter portion 30. Mounting portion 20 is releasably secured to handle 12 by means of a releasable mounting assembly 14 on one end of handle 12. Blade 10 is formed of a ceramic material such as zirconia and the like.

Blade 10 is best shown in FIGS. 2-5 wherein it may be seen that, in this exemplary embodiment, blade 10 is generally trapezoidal in shape with mounting portion 20 being generally rectangular and with cutter portion 30 being generally triangular. Mounting portion 20, if desired, may be provided with a mounting hole 22 or other mounting structure compatible with handle 12. Cutter portion 30 has first and second side edges 32 and 34 and side surfaces 40 and 50. Side edges 32 and 34 converge at a distal cutting tip 36 at an acute distal angle "a" with respect to one another with one of the side edges, such as side edge 34, defining a cutting edge. Distal angle "a" in this embodiment is selected to be 22½°.

The cutting edge for blade 10 is formed by first and second cutting faces 38 and 48. Cutting face 38 intersects side surface 40 along a line of intersection 42 likewise, cutting face 48 intersects side surface 50 along a line of intersection 52. As is best shown in FIG. 3, side surfaces 40 and 50 may be substantially parallel to one another, although it is not essential for them to be so. At any rate, a plane P which defines a longitudinal reference plane located centrally between side surfaces 40 and 50. Plane P extends longitudinally of cutter portion 30 and either includes cutting edge 34 or is slightly offset and substantially parallel to cutting edge 34, as described more thoroughly below and is as seen in FIG. 3.

As is shown in best in FIGS. 3 and 4, cutting faces 38 and 48 are oriented at an acute bevel angle "b" with respect to one another and are bisected by a reference plane $P_1$ which is parallel to reference plane P and which contains cutting edge 34. Thus, cutting edge 34 is offset from central reference plane P so that, with this construction, it may be seen that the width "r" of cutting face 38, being that distance between cutting edge 34 and line of intersection 42, is greater than the width "s" of cutting face 48 defined as that distance between cutting edge 34 and line of intersection 52. Bevel angle "b" is preferably within a range of 16° to 34°, and, in the exemplary embodiment shown in FIG. 3, bevel angle "b" is 28°. This structure provides a narrower profile for the cutting margin adjacent cutting edge 34 than if the cutting faces were symmetrical about plane P. However, despite the narrower profile the initial margin immediately adjacent edge 34 diverges symmetrically about plane $P_1$ at the bevel angle.

As is best shown in FIGS. 2, 4 and 5, distal end 36 of ceramic blade 10 is truncated at an angle "c" with respect to cutting edge 34. Preferably, this angle is approximately 45° but may be within a range of approximately 40°-50°. This truncation is usually provided when distal angle "a" is less than 40°. so that the actual cutting tip 37 is formed at a larger angle than angle "a" so as to be less fragile and thus less susceptible to breakage. Thus, distal tip 36 has a flat distal surface 54 which is trapezoidal in configuration, as is shown in FIGS. 4 and 5. It should be understood, however, that other blade shapes could be employed. For example, it would be possible to form angle "a" to be within the truncation angle range and thereby eliminate the separate truncation.

As noted above, blade 10 is preferably constructed of an integral piece of ceramic material such as zirconia and the like. A particular feature of the present invention which, in addition to the structure shown in FIGS. 2-4, departs from the previous uses and constructions of ceramic blades may be best seen in FIG. 5. As is more thoroughly discussed below, during fabrication of a ceramic blade, such as blade 10, the grinding of the cutting faces, such as faces 38 and 48, is accomplished by finish or "polish grinding" the faces in a direction that is along the respective face and perpendicular to cutting edge 34. As is shown in FIG. 5, this procedure results in the formation of striations 60 in FIG. 5. The length of these striations generally extend from lateral edge 34 to the line of intersection of the respective face 38, 48 with its side surface 40, 50, for example, as is shown in FIG. 5, with respect to line of intersection 42. The lateral dimension of striations 60 are naturally dependent upon on the grit size of the polish grinder, described below, but are preferably on the order of 20-40 microns.

Not only does the provision of striations 60 perpendicular to cutting edge 34 have benefits as to blade endurance, but also a further added benefit is unexpectedly realized in that any micro-chipping of the material forming cutting edge 34 will tend to cause material between adjacent striations to slough in a direction perpendicularly of edge 34. This "pressure flaking" action actually tends to increase the sharpness of cutting edge 34 as opposed to diminishing the sharpness thereof. Accordingly, with reference again to FIG. 5, it may be appreciated that the "grain direction" of striations 60 extend perpendicularly from cutting edge 34 along a respective cutting face, such as face 38. It should be fully appreciated that the directions of the striations along cutting face 48 are similar to that shown in FIG. 5.

An alternate embodiment of the cutting blade 10 is shown in FIGS. 6 and 7. Here, ceramic blade 110 is constructed in the configuration of a standard utility knife blade so that it has a central body portion 120 that serves as a mounting portion for oppositely projecting cutter portions 130 and 131. Blade 110 has a pair of side edges 132 and 134 opposite mounting portion 120 and cutter portions 130, 131 with one of the side edges, such as side edge 134 defining a cutting edge for ceramic blade 110. A pair of notches 122 are provided, as is known in the art, for attachment to a standard utility knife handle, not shown.

As is best shown in FIG. 7, blade 110 has a pair of side surfaces 140 and 150 and a pair of cutting faces 138 and 148 extend from cutting edge 134 to intersect surfaces 140 and 150, respectively, at intersection lines 142 and 152. Cutting faces 138 and 148 are formed at an acute bevel angle "d" with respect to one another which again may be preferably within a range of 16° to 34°. As noted above, no truncation is necessary since the distal angle "$a_1$" is approximately 45°.

It may also be seen in FIG. 7 that a central reference plane $P_2$ is located mid-way between and parallel to side surfaces 140 and 150; thus, cutting faces 138 and 148 are symmetrical about plane $P_2$. This construction is therefore different than the off-set cutting edge 34 described with respect to FIG. 3. In the embodiment shown in FIGS. 6 and 7, blade 110 is not intended in industry for the fineness of cuts as is blade 10; rather, blade 110 is designed for a heavier usage so that an increased rapid thickening of the cross-section of blade 110 is desirable in a direction away from cutting edge 134. Again, however, the grain direction or striations on each of cutting faces 138 and 148 would extend perpendicularly from cutting edge 134 toward the respective intersection line 142, 152.

Further alternate embodiments of the present invention are shown in FIGS. 8-10. For example, in FIGS. 8 and 9, ceramic blade 70 is shown laminated to a backing substrate 80, which may be a relatively rigid plastic or metal material. In FIGS. 8 and 9, substrate 80 is in the form of a metallic plate, such as steel, and ceramic blade 70 is adhered in any convenient manner known in the art. It may be seen that ceramic blade 70 has a side edge 72 which forms a cutting edge for the laminate blade and a second side edge 74 which is coextensive side edge 84 of substrate 80. Edge 72 of ceramic blade 70 extends beyond a second edge 82 of substrate 80 as is best shown in FIG. 9. Thus, ceramic blade 70 has a cutting margin 76 which is adjacent cutting edge 72 that is supported by substrate 80. This construction helps reduce brittleness and breakage of ceramic blade 70.

Cutting edge 72 may have a profile similar to that described with respect to FIG. 3 or with respect to FIG. 7, if desired. However, in the embodiment shown in FIGS. 8 and 9, cutting edge 72 is created by a single ground cutting face 78 with a surface 79 portion of side surface 77 along margin 76 defining the other cutting face for edge 72. Thus, cutting face 78 is formed at a bevel angle "$b_1$" with respect to surface 77, and angle "$b_1$" is again in the range of 16° to 34°. Striations perpendicular to edge 72 are again present on cutting face 78 although such perpendicular striations would not be present on surface 77. This construction is provided, therefore, to demonstrate not only that a laminate construction can be employed but also that a cutting edge may be formed by grinding a single cutting face.

Yet another alternate embodiment of the ceramic blade according to the present invention is shown in FIG. 10. Here, ceramic blade 90 is formed integrally with ceramic handle 91 so that blade 90 projects longitudinally outwardly from handle 91 to terminate in a distal tip 96. Blade 90 has a first or cutting edge 92 and a second edge 94 opposite edge 92. Again, edge 92 may have a profile similar to that described with respect to FIG. 3 or FIG. 7. The striations formed on each of cutting faces 98 and 100 again extend perpendicularly from cutting edge 92. Thus, in the radial region 102 adjacent distal tip 96, the striations will extend along the radius defining the curvature of distal end portion 102. The blade shown in FIG. 10 may be particularly useful for medical applications, such as a scalpel or other cutting instrument construction, since it may be particularly adapted to sterilization. Due to its entire integral ceramic (zirconia) construction, blade and handle combination 90, 91 may be sterilized at temperatures that would melt many metals. Furthermore, because of its integral construction, there are no recesses which could typically harbor bacteria, viruses or microbes.

From the foregoing, the method of fabricating ceramic blades according to the general embodiment of the present invention may be now fully understood and appreciated. In the most generalized methodology, a method of manufacturing a ceramic blade comprises a first step of producing a blade blank, such as blade blank having the general configuration shown in FIG. 2 (without the truncation) in FIG. 6 or other desired shape. Next, this blade blank which is formed out of an integral piece of ceramic material such as zirconia, is formed by both rough and polish grinding at least on cutting face along one edge of the blade blank so that the cutting face extends from a cutting edge to intersect respective side surfaces of the blade blank. The step of polish grinding the cutting face is performed by grinding in a direction perpendicularly of the intermediate cutting edge to establish striations along a grain direction extending perpendicularly from the final cutting edge toward the respective side surface.

The step of rough grinding the intersecting cutting faces may be by means of an intermediate grinding wheel having a grit size of between 180 and 320. This intermediate wheel may be a rotatably driven wheel of which is rotated about an axis that is perpendicular to each respective cutting face. The step of polish grinding each cutting face may be by means of a final grinding wheel having a diamond grit of a size between 500 and 800. This final wheel is preferably rotatably driven about a second axis that is parallel to each respective cutting face. Preferably, however, a pair of intersecting cutting faces are formed with these cutting faces diverging from one another from the cutting edge to intersect a respective side surface of the blade. If desired, it is possible that one of the cutting faces is both rough and polish ground prior to the formation of the second of the cutting faces but, alternatively, both cutting faces may be rough ground before either of them are polished ground.

To accomplish the general methodology, two blade forming systems are herein described each implementing the preferred methodology. A first one of these systems is shown in FIGS. 11-15 while a second system is shown in FIGS. 16-22. While the first methodology of FIGS. 11-15 is described with respect to a blade such as that shown in FIGS. 2-5, the ordinarily skilled person in this field will readily be able to expand the teachings to encompass other blade constructions and shapes, as well. Likewise, while the second methodology of FIGS. 16-22 is described with respect to the blade shown in FIGS. 6 and 7, it should be appreciated that it has equal applicability to the blade shown in FIGS. 2-5 as well as other blade configurations.

Turning, then, to FIGS. 11-15, it may be seen that one exemplary methodology according to the preferred method of production of ceramic blades according to the present invention may encompass the first step of providing a production blank or blade blank 200 such as that shown in FIG. 11. Here, blade blank 200 is in the form of an elongated rectangular strip of zirconia material. Strip 200 has a pair of ends 202 and 204 and side edges 206 and 208. Further, with respect to FIGS. 11 and 12, it may be seen that strip 200 has one side surface 210 and a second side surface 212. Referring then, to FIG. 12, it may be seen that the specific method according to this first exemplary methodology includes the formation of opposite cutting edges 207 and 209 respectively on side edges 206 and 208. Each of these edges, if desired, can have the profile such as that shown in FIG. 3. Preferably, edges 207 and 209 are created by forming cutting faces 216 and 217 as well as cutting faces 218 and 219 respectively for edges 207 and 209. These faces may be formed by first rough grinding the faces into the desired configuration, for example, by means of an intermediate grinding wheel having a diamond grit of a size between 180 and 320 and preferably 320 grit. These faces may then be polished ground by a final grinding wheel having a diamond grit of a size between 500 and 800. By using this size of grit, striations having a width of between 20 and 40 microns result.

After each of cutting edges 207 and 209 are formed, it may be seen that this blade blank may be separated into a plurality of intermediate blade sections or blade pairs 220, each consisting of a pair of joined blades. A single blade section 222 is formed at each end of the blade blank 200. This operation, as is shown in FIG. 13, is accomplished by separating or severing strip 200 diagonally along cut lines 221 and 223. As a result, with the exception of end portions 223, which each contain a single blade, it may be seen that intermediate blades 220 are cut and result in a pair of blades, as shown in FIG. 14. This intermediate blade section 220 may then be cut at 225 to form individual blades 230 each having a configuration of that shown in FIGS. 2-5, above. As is shown in FIG. 15, each blade 230 may then have its distal tip 232 truncated, if desired, and a mounting hole 234 may be formed as well. It should be noted however, that if desired, holes 234 could be formed in strip 200 during any step of the processing so that the ordinarily skilled artistan will realize that hole 234 does not need to be formed as the final step. Further, it should be understood that each of end sections 223 are cut into a single blade.

From the foregoing, it may be seen that this first methodology results in the production of a multiple number of ceramic blades 230 from a single strip 200. This process can be conducted as a continuous process where ceramic strip 200 is produced by some continuous process as a continuous ribbon or may be formed out of a strip of any desired length. This process helps to minimize any scrap produced in the manufacturing operation.

Figure 18:
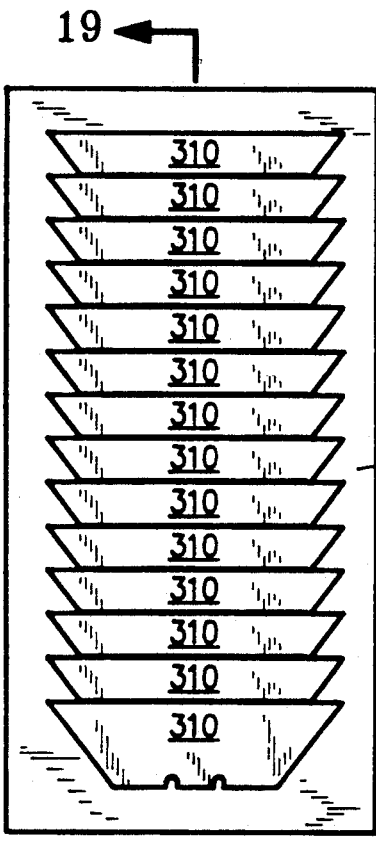
FIG. 18 is a top plan view of the fixture of FIG. 17 shown with a plurality of blade blank received therein.
Figure 19:
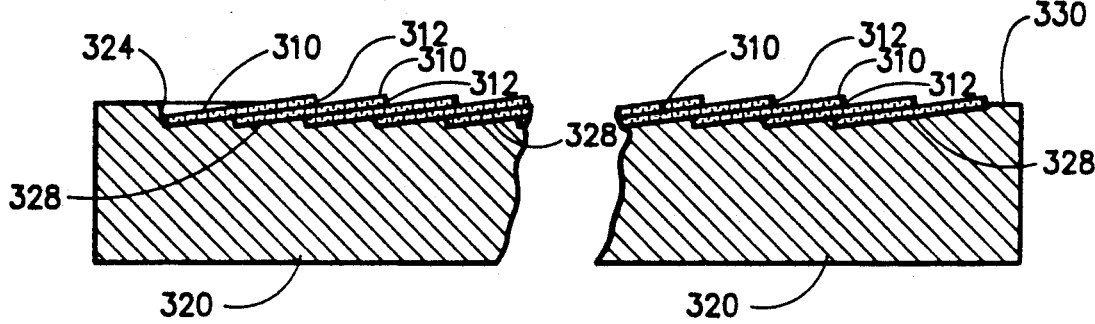
FIG. 19 is a cross-sectional view taken about lines 19—19 of FIG. 18.

A second methodology encompassing the generally preferred method of the present invention is shown in FIGS. 16-22. While this methodology is described with respect to the production of a ceramic blade such as blade 110, it should be understood that the method described in FIGS. 16-22 is equally applicable to the ceramic blade 10 as well as other blades of desired configuration. In this second exemplary methodology, therefor, it may be seen that a plurality of blade blanks, such as blade blank 310 shown in FIG. 16 are provided and may be mounted in the fixture 320, shown in FIG. 17 to result in an ensemble of mounted blades 310, as is shown in FIGS. 18 and 19.

Figure 17:
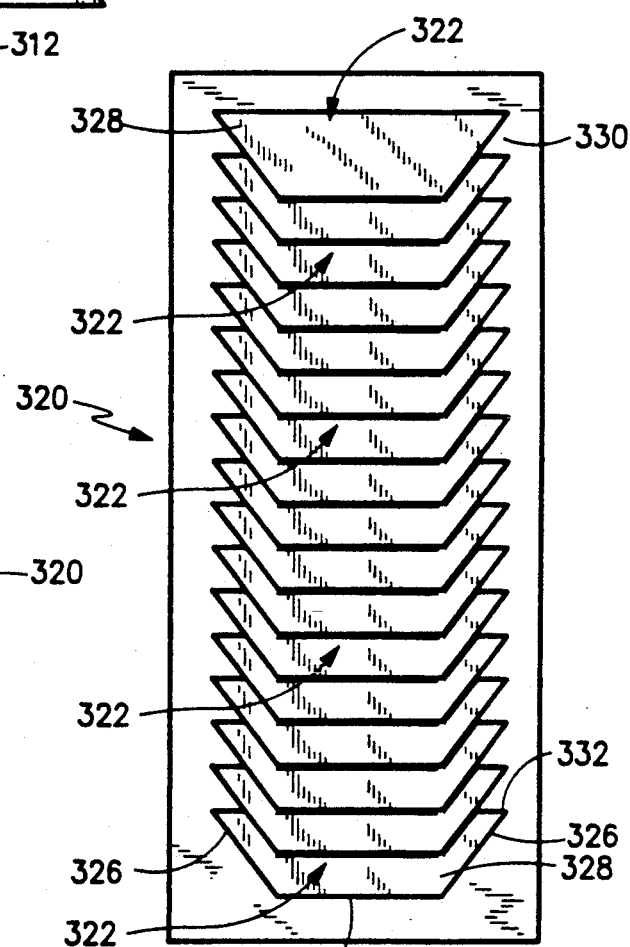
FIG. 17 is a top plan view of mounting fixture adapted to receive a plurality of blade blank such as those shown in FIG. 16 for purposes of fabricating ceramic blades according to the second exemplary methodology of the present invention.

As is shown in FIG. 16, each blade blank 310 has a first side edge 312 and a second side edge 314 that is provided with a pair of mounting notches 316, as is known in the art for a standard utility blade. Further, each blade blank 310 has end edges 318 which are formed each at an acute angle to side edge 312 and at an obtuse with respect to side edge 314. Turning to FIG. 17, it may be seen that fixture 320 has a plurality of formed cavities 322 each of which has a bottom edge 324 which is dimensioned to nestably receive side edge 314 of a respective blade blank 310 and a pair of side edges 326 that are dimensioned to nestably receive side edges 318 of a respective blade blank 310. A bottom surface 328 of each cavity 322 is formed at a slight acute angle with respect to flat face 330 of fixture 320 with this angle being one-half of the desired bevel angle "b" between the cutting faces to be formed on each blade blank 310. Accordingly, each cavity 322 tilts upwardly from a deepest portion along edge 324 towards an intersection line 332 that is co-extensive with surface 330 of fixture 320.

As is shown in FIGS. 18 and 19, then, a plurality of blade blanks 310 are mounted in fixture 320 by nestably placing a respective blade blank 310 in a respective cavity 322. As is best shown in FIG. 19, an upper portion of edge 312 of each blade blank 310 protrudes slightly above surface 330 to be exposed for a grinding operation. Preferably, each of blades 310 are held in place by means of a spray lacquer which is sprayed over the ceramic blades 310 after they are placed in a respective cavity 322.

Turning to FIGS. 21a and 21b, the blades in the fixture 330 may now be rough ground and, to this end, as is shown in FIG. 21a a plurality of fixtures 320 having blades 310 mounted therein may be simultaneously rough ground by a cup grinder wheel 340 which rotates on an axial 342 counterclockwise in the direction of arrow 344, as is shown in FIG. 21a. As is shown in FIG. 21b, fixtures 320 are supported on machine table 346 and wheel 340 may be longitudinally advanced in the direction of arrow 348 as it rotates counterclockwise on axial 342. Wheel 340 may have a grit size of between 180 and 320 but may preferably be a 220 grit diamond wheel which is dressed by a suitable dressing compound, as is known in the art. The down feed rate of wheel 342 should be adjusted as is known in the art and with respect to the amount of cutting for each ceramic blade 310.

Before removing blade blanks 310 from fixture 320 the cutting faces thus formed on each of edges 312 may be polish ground to form a finished cutting face having perpendicular striations, as described with respect to FIG. 5. This operation may be seen in FIGS. 22a and 22b. Here, it may be seen that finish grinding wheels 360 are provided with respect to each longitudinal array of fixtures 320 with wheels 360 being mounted on a common rotational axis 362. As is shown in FIG. 22b, each wheel 360 rotates clockwise in a direction of arrow 366 and the array of wheels 360 may be longitudinally advanced back and forth across fixtures 320 in the direction of arrow 368. It should be appreciated that in this grinding step, each of the blades in fixtures 320 shown in FIG. 22b are oriented in the manner shown in FIG. 19, so that, as wheel 360 passes across each of the blades 310 the direction of motion of the edge surface 361 of wheel 360 moves from a its final cutting edge toward the thicker portion of the blade, as is a standard grinding procedure. Polish grinding wheel 360 again preferably has a grit size of between 500 and 800.

Once a desired first cutting face has been formed both by rough grinding and polish grinding, the fixtures 320 may be removed from the grinder, rinsed and placed in an action bath to remove each of blades 320 therefrom. After these blades are dried, they can be again mounted in fixtures 320 so that the first cutting face 370 which has been formed on each blade 310 is oriented facing fixture 320, as is shown in FIG. 20. Again, lacquer is sprayed over these blades to adhere them to fixture 320 and the rough and polish grinding steps, described above with respect to FIGS. 21 and 22 are repeated to cut the second cutting face. Since the angle of bottom surface 328 is one-half of the bevel angle, the resulting cutting faces diverge from each other at the bevel angle "b" discussed above.

From the foregoing, it should be recognized that the underlying method described in this application may be implemented by either of the methodologies discussed. Further, it is within the scope of this invention for other specific methodologies to be employed without departing from the general methodology discussed. To this end, it is not the Applicants' intention to encompass extension of the general methodology described herein.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. A blade adapted to be held by a handle for use in performing cutting operations comprising a blade body having a mounting portion adapted to be received and retained by said handle and a cutter portion extends from said mounting portion, said cutter portion having first and second side edges at least one of said first and second side edges defining a cutting edge said first and second side edges converge at a distal acute angle with respect to one another of less than 40° to from a distal cutting tip that is truncated along a straight line at an angle of truncation with respect to said cutting edge, said cutting edge of at least 40° being formed by first and second cutting faces oriented at an acute bevel angle "b" with respect to one another, said mounting portion and said cutter portion fabricated out of an integral piece of ceramic material wherein said bevel angle "b" is within a range of 16° to 34°, inclusively.

2. A blade according to claim 1 wherein said distal acute angle is between 20° and 30°, inclusively.

3. A blade according to claim 1 wherein said cutter portion has a pair of side surfaces extending between said first and second side edges on either side thereof and wherein each of said cutting faces extend between said cutting edge and a respective side surface to define a cutting surface width.

4. A blade according to claim 3 wherein said cutter portion has a cutter portion reference plane located centrally between said side surfaces and extending longitudinally of said cutter portion substantially parallel to said cutting edge, said cutting edge being offset from the reference plane.

5. A blade according to claim 4 wherein one of said cutting surfaces has a cutting surface width that is wider than the width of the other cutting surface.

6. A blade according to claim 3 wherein each of said cutting surfaces has a grain direction that is substantially perpendicular to said cutting edge.

7. A blade according to claim 3 wherein said side surfaces are generally parallel to one another.

8. A blade according to claim 1 wherein said angle of truncation is between 40° and 50°, inclusively.

9. A blade adapted to be held by a handle for use in performing cutting operations comprising a blade body having a mounting portion adapted to be received and retained by said handle and a cutter portion attached to said mounting portion, said cutter portion having first and second side edges which converge to form a distal cutting tip and having a pair of side surfaces extending between said first and second side edges on either side of said cutter portion with at least one of said first and second side edges defining a cutting edge, said cutting edge being formed by first and second cutting faces oriented at an acute bevel angle with respect to one another said mounting portion and said cutter portion fabricated out of an integral piece of ceramic material with at least one of said cutting faces having striations having a grain direction that is substantially perpendicular to said cutting edge.

10. A blade according to claim 9 wherein said striations have a width of between 20 and 40 microns, respectively.

11. A blade according to claim 9 wherein one of said cutting faces is formed by a marginal portion of one of said side surfaces.

12. A blade according to claim 9 wherein each of said cutting faces is at an angle to a respective side surface and are each provided with said striations, each of said cutting faces extending from said cutting edge to intersect a respective said side surface.

13. A blade according to claim 9 wherein said first and second side edges converge at a distal acute angle within a range of 40° to 50°, inclusively.

14. A blade according to claim 13 wherein said distal cutting tip is truncated along a straight line to form said distal acute angle.

* * * * *